United States Patent [19]

Sauer

[11] Patent Number: 5,682,651
[45] Date of Patent: Nov. 4, 1997

[54] ONE-PIECE HOUSING OF A WORM DRIVEN HOSE CLAMP

[75] Inventor: Heinz Sauer, Ronneburg, Germany

[73] Assignee: Rasmussen GmbH, Maintal, Germany

[21] Appl. No.: 760,696

[22] Filed: Dec. 5, 1996

[30] Foreign Application Priority Data

Dec. 11, 1995 [DE] Germany .................. 195 46 077.4

[51] Int. Cl.$^6$ .................................................. F16L 33/08
[52] U.S. Cl. .................................................... 24/274 R
[58] Field of Search .............................. 24/20 LS, 279,
24/274 R, 274 P, 274 WB

[56] References Cited

U.S. PATENT DOCUMENTS

| 3,371,392 | 3/1968 | Rueckheim | 24/274 R |
| 4,244,088 | 1/1981 | Sauer | 24/274 R |
| 4,300,270 | 11/1981 | Sauer | 24/274 R |

FOREIGN PATENT DOCUMENTS

| 28 54 675 | 3/1980 | Germany . |
| 26 24 114 | 7/1980 | Germany . |
| 34 31 751 | 3/1986 | Germany . |
| 39 41 135 | 1/1991 | Germany . |
| 456 272 | 7/1968 | Switzerland . |

Primary Examiner—James R. Brittain
Attorney, Agent, or Firm—Darby & Darby

[57] ABSTRACT

A one piece housing for a worm driven hose clamp includes a screw and a clamping band. The screw has a head and a shank. The shank is threaded. The housing includes a vaulted housing upper part and a housing lower part. The vaulted housing upper part has an open edge. The vaulted housing upper part receives the shank of the screw and supports the head at the opening edge. The housing lower part receives a first end segment and a second end segment of the clamping band. The first end segment has screw-thread segments. The threaded shank meshes with the screw thread segments. The housing lower part includes a base. The second end segment is fixed to the base. The housing lower part has only one side extension part for supporting the housing against turning during tightening of the screw. The side extension part has an upper wall comprising an upper wall segment, a lower wall segment and an upward-projecting wall. The upper wall segment and the lower wall segment overlap each other. The upward-projecting wall is connected to the base and, by a transition segment, to the upper wall segment. A portion of the transition segment is formed to create a cutout. The lower wall segment extends, at least in part, to an inner side of the upward-projecting wall. The lower wall segment extends, at least in part, into the cutout of the transition segment.

13 Claims, 3 Drawing Sheets

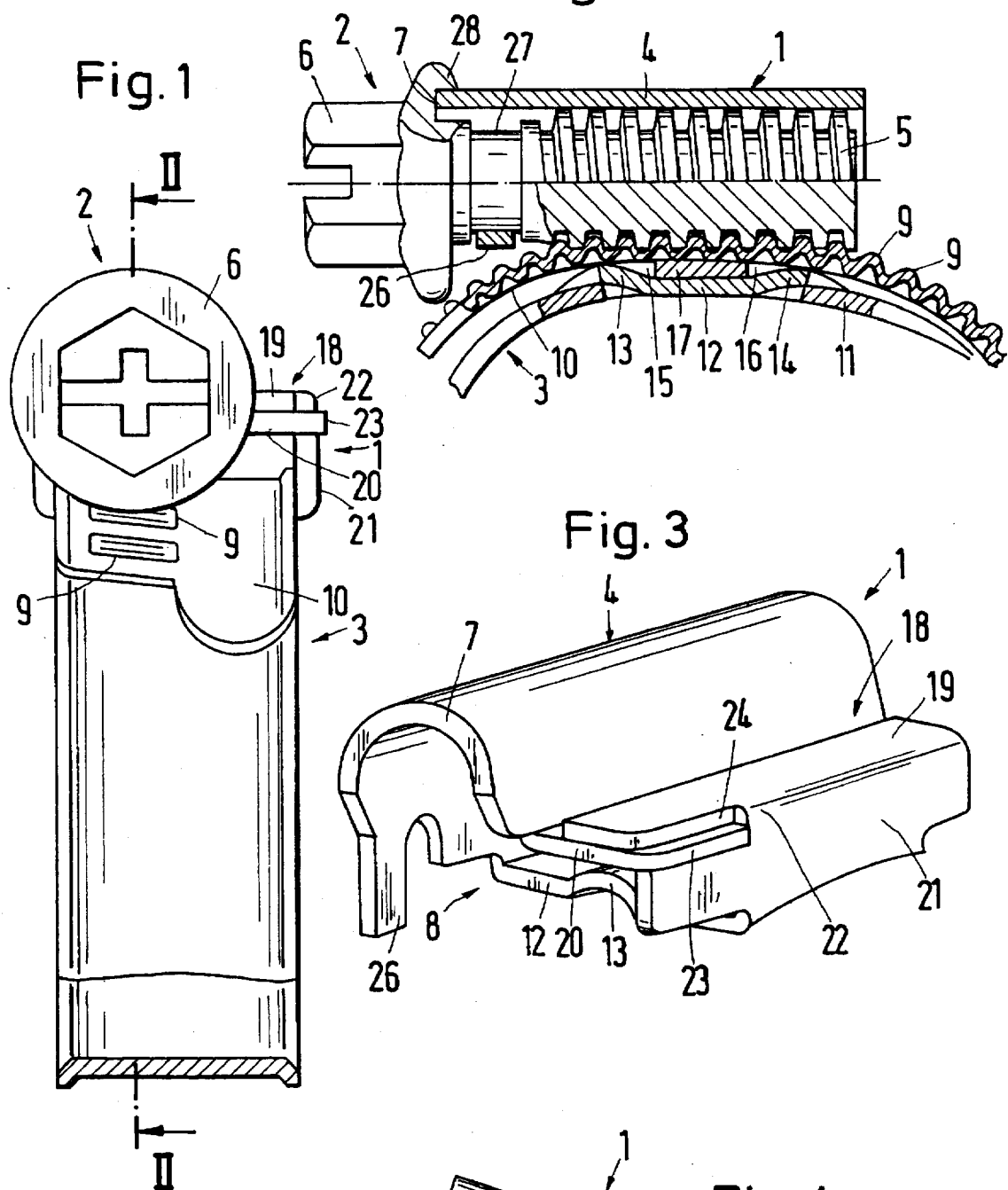

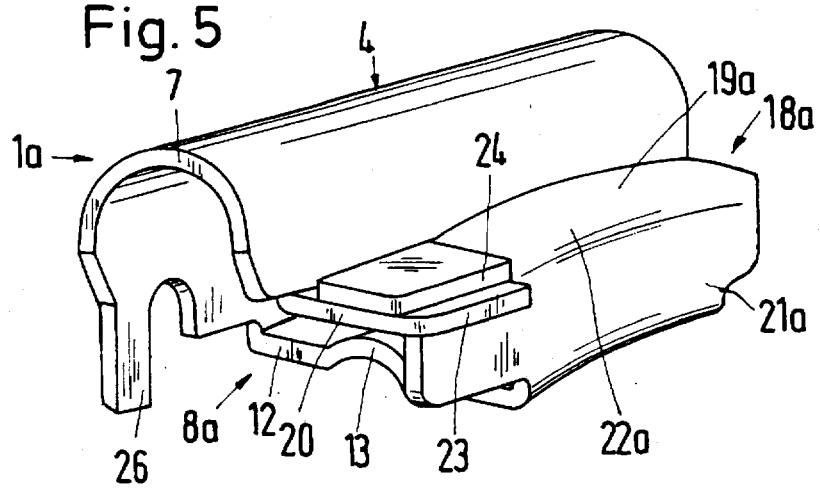
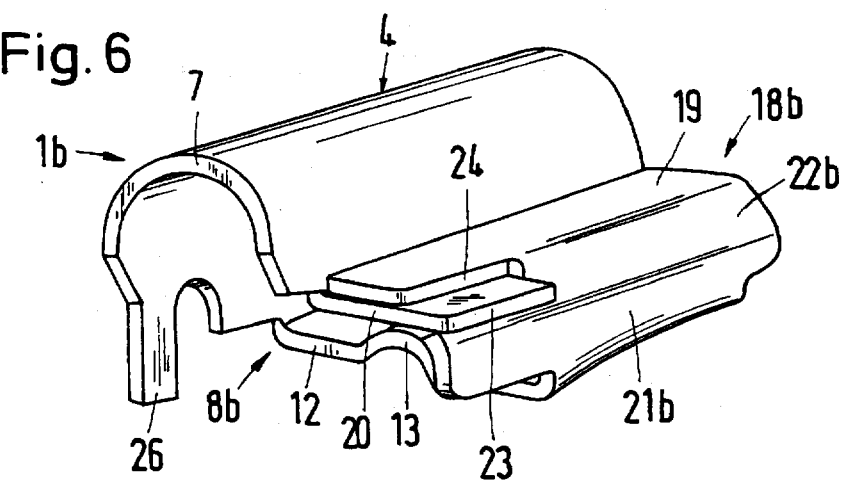
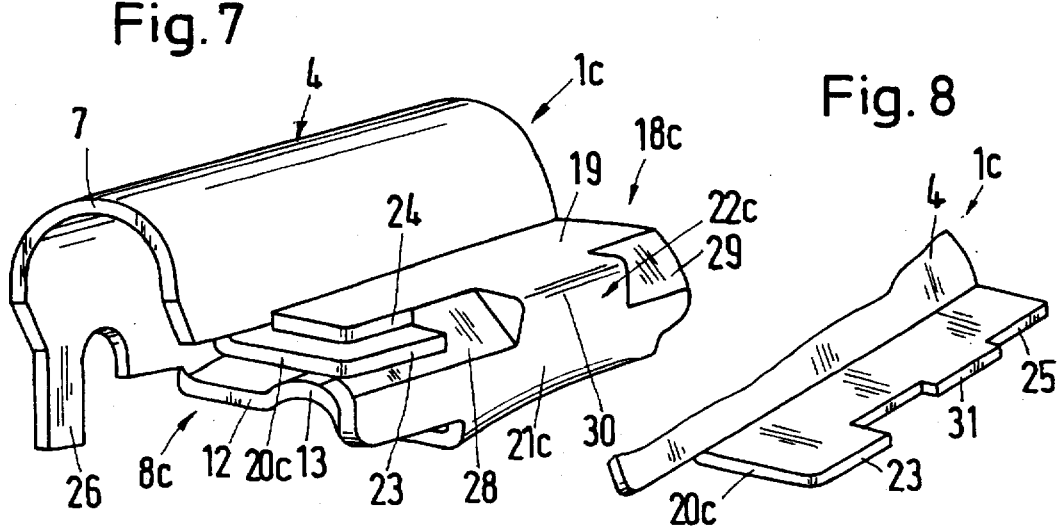

5,682,651

ONE-PIECE HOUSING OF A WORM DRIVEN HOSE CLAMP

BACKGROUND OF THE INVENTION

1. Field of the Invention

The present invention relates to a one-piece housing for a worm driven hose clamp. The housing includes a vaulted housing upper part for receiving the shank of a straining screw. The head of the screw is supported by an opening edge of the housing upper part. The housing also includes a lower part for receiving the end segments of a clamp band. A first end segment of the clamp band has screw-thread segments. The straining screw thread meshes with the band screw-thread segments. The second end segment of the clamping band is fixed to a base of the housing. The housing lower part has only one side extension part that supports the housing against turning when the straining screw is tightened. The extension part has an upper wall that is made of two wall segments that overlap each other. An upward-projecting wall is connected to a side of the base. The upward-projecting wall is connected to the upper wall of the overlapping two wall segments by means of a transition segment.

2. Discussion of the Related Art

Housings for worm driven hose clamps are known, for example, from the brochure NORMA Assortment No. 11 (February 1994); which is distributed by the German company Rasmussen GmbH. The known housing has a lower wall segment of the extension part that is bent around an upper edge segment of an upward-projecting wall so that the bent around portion of the lower wall segment is disposed outside of the upward-projecting wall. The bent portion of the lower wall segment has elongated openings. Tabs, which extend from the upper edge of the upward-projecting wall, extend through the openings and are, thereafter, bent around the upper side of the lower wall segment.

It is an object of the present invention to reduce the amount of material needed for the housing of the worm driven hose clamp, without decreasing the strength of the housing.

SUMMARY OF THE INVENTION

In accordance with the present invention, the above-identified object is achieved by extending a portion of the lower wall segment into the upward-projecting wall while another portion of the lower wall segment extends into a cutout of the transition segment.

In accordance with the present invention, the part of the lower wall segment that is bent around the outside of the upward-projecting wall is no longer required. This part can be omitted because, in contrast to what was previously thought, this part is not loaded with tension forces. Thus, this part does not contribute to the strength of the housing. Omitting this part also has the advantage that the width of the housing is decreased by approximately the thickness of the material from which the housing is manufactured. Thus, the required mounting space is correspondingly smaller.

The cutout in the transition segment is preferably a slot that projects in the longitudinal direction of the transition segment. The cutout extends from an opening edge of the extension part that is disposed proximate to the straining screw head. A portion of the lower wall segment projects into the slot against the slot-delimiting upper edge of the upward-projecting wall. Another portion of the lower wall segment is supported against the inside surface of the upward-projecting wall and against the underside of the upper wall segment. The upper wall segment and the lower wall segment work together against the moment of torsion that is exerted on the housing upper part when the straining screw is tightened, thereby preventing an opening up of the housing in the area of the side extension part.

The upper and lower wall segments, which overlap each other, extend tangentially with respect to the circumference of the clamp over the entire length of the extension part. Overlapping the wall segments results in an especially high strength of an upper wall, which, thus, resists against an opening up of the housing upper part when the moment of torsion is applied.

The transition segment is preferably flat and forms an obtuse angle with respect to the upper wall segment and the upward-projecting wall. A flat transition segment contributes to a stiffening of the upper wall thereby preventing an opening up of the housing upper part.

An additional stiffening of the upper wall can be achieved by modifying the transition segment so that it is flat in its end regions, which are adjacent to a first opening edge and a second opening edge of the extension part. The transition segment has an approximately triangular cross-section in a middle region between the flat end regions. The flat end regions form an obtuse angle with respect to the upper wall segment and the upward-projecting wall. The lower wall segment has a projection that engages in the middle region of the transition segment.

In addition, or as an alternative, to the above described embodiments, the upper and the lower wall segments can be joined as a single piece of material so that they will be especially stiff. The wall segments are preferably joined by spot welds, and, more preferably, by projection welds. Spot welds have the advantage that they can be produced easily and quickly. Projection welds have the advantage that several spots can be securely welded at the same time. In addition, small bulges or buttons are driven into the metal sheets that are to be joined. The sheets are then pressed against each other between electrodes, and several projections can be welded at the same time by means of a surge of current.

In addition, or as an alternative, to the above described embodiments, the transition segment can have a plurality of beads extending in the direction of the bend. The beads cause a stiffening of the bend, and simultaneously, prevent the upper wall segment from bending open.

The housing is preferably made of hardened steel, which makes the housing elastic. The housing includes a reverse-lock tab depending from the housing upper part. Instead of the two reverse-lock tabs that have been previously used, only one tab is used in the present invention. The tab engages a circumferential groove in the straining screw. The groove is disposed between the screw head and the threaded shank. The hardened housing is especially stiff. Thus, it resists deformation when tensioned. The housing is bent into the desired final position before it is hardened. The tab can be bent back into its initial position to permit the insertion of the screw shank into the housing. After the screw shank is inserted, the tab is allowed to spring back into its final position (i.e., the tab is disposed in the groove between the screw head and the threaded shank).

The part of the lower wall segment that extends into the cutout is preferably disposed at a predetermined distance from an edge of the upper wall segment that is disposed proximate to the straining screw head. Because of the elasticity of the housing, during tightening, the upper part of the housing, together with the lower wall segment, turns slightly, relative to the housing base, around an axis which is perpendicular to the base of the housing. Thus, the housing is elastically pre-stressed. If, after tightening, the clamped hose contracts due to a decreasing ambient temperature, the clamp then contracts somewhat due to the elastic pre-stressing of the housing, and thereby compensates for the shrinking of the hose material. In the reverse situation, when the ambient temperature increases and the hose material expands correspondingly, the clamp elastically yields somewhat so that the hose material is not stressed too greatly.

The predetermined distance corresponds to at least approximately II·Δd, where Δd corresponds to the change of the outside diameter, in dependency on the temperature within the permissible operating temperature range of the elastomeric hose that is to be clamped by the worm driven hose clamp. Thus, the changes in the thickness of the hose material can largely be compensated for across the entire operating temperature range.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a side view, with parts broken away, of a worm driven hose clamp having a housing in accordance with the present invention;

FIG. 2 is a cross-sectional view taken along lines II—II of FIG. 1 and looking in the direction of the arrows;

FIG. 3 is a perspective from view of the housing of the worm driven hose clamp shown in FIG. 1;

FIG. 4 is a perspective rear view of a rear portion of the housing; and

FIGS. 5–12 illustrate various embodiments of the housing.

DESCRIPTION OF THE PREFERRED EMBODIMENTS

Figure 9:
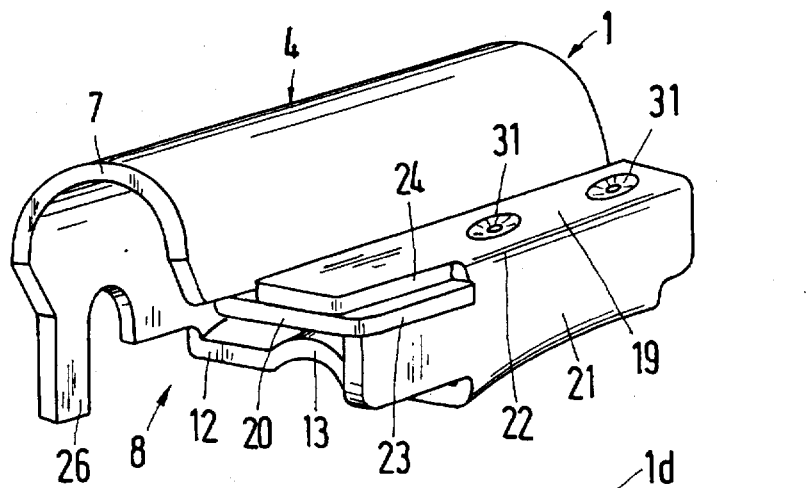

Referring now to FIGS. 1–4, a worm driven hose clamp is illustrated. The hose clamp includes a housing 1, a straining screw 2 and a clamping band 3. All three parts are preferably made of galvanized steel.

Housing 1 has a vaulted upper part 4 to receive the shank of straining screw 2, which is provided with a thread 5. Upper part 4 also supports the head 6 of the straining screw at an opening edge 7 of the housing upper part 4. In addition, housing 1 has a lower part 8 that receives and seats an end segment 10 of the clamping band 3. End segment 10 is provided with thread segments 9. Thread segments 9 are preferably stamped into the end segment 10 of the clamping band 3. The straining screw thread 5 engages with the end segment thread segments 9 (see FIG. 2). Lower part 8 also receives and fixedly seats the other end segment 11 of the clamping band 3. End segment 11 is seated with a positive-fit to the base 12 of housing 1. To form this positive-fit, base 12 has, at each of its axial ends, a bead 13, 14, which is pressed upwardly. Each of the beads engages in a tetragonal hole 15 or 16 in end segment 11, and are separated by a transverse web 17. Holes 15, 16 are thereby pressed radially outwardly.

Lower part 8 of housing 1 has a side extension part 18 that supports housing 1 against turning during a tightening of the straining screw 2. Extension part 18 has an upper wall that is made of two wall segments 19 and 20. Wall segments 19, 20 overlap each other. A wall 21 integrally connects base 12 to upper wall segment 19. In the illustrated embodiment, wall 21, base 12 and wall segment 19 are of one-piece construction. A transition between wall segment 19 and wall 21 is formed by transition segment 22. A portion 23 of lower wall segment 20 extends into a cutout 24 of transition segment 22 (see FIG. 3). A portion 25 of lower wall segment 20 extends in the longitudinal direction to the inside surface of wall 21 (see FIG. 4).

In this embodiment, cutout 24 is a slot that extends from an opening edge of transition segment 22 that is proximate to the straining screw head 6. Wall segments 19, 20, which overlap each other, extend tangentially with respect to the clamp circumference over the entire length of extension part 18. However, it is also possible to omit the portion of the wall segment 19 that extends over the length of the extension part 18 because this portion contributes less to the stiffening of the housing 1, as will be explained below. Cutout 24 would, thus, extend over the entire width of the lower wall segment 20 all the way to the vaulted housing upper part 4.

During tensioning of the straining screw 2, end segment 10 of the clamping band 3 exerts, through its thread segments 9 which are in engagement with thread 5, a moment of torsion on the straining screw 2. The moment of torsion is applied around an axis, which is transverse to the longitudinal axis of the straining screw and is perpendicular to the plane of a circumscribed circle of the clamping band. More specifically, the moment of torsion is applied in the counterclockwise direction as viewed in FIG. 2. As a result, the free end of the straining screw 2, which is to the right in FIG. 2, tends to press the housing upper part 4 upward. Additionally, the rearward end of the upper wall of the extension part 18, which is comprised of wall segments 19 and 20, tends to be pressed upward as well. Thus, side extension part 18 and housing upper part 4 tend to open up. To counter the effects of this moment of torsion, the upper wall segment 19 and the lower wall segment 20 extend to the rearward end of the housing 1. In this rearward part of the housing, rear part 25 of the lower wall segment 20 is supported on the rearward part of the upper wall segment 19. The forward part of upper wall segment 19, which is closer to the screw head 2, contributes less to preventing a pressing up (opening) of the housing 1. Thus, the forward portion of upper wall segment 19 can be omitted.

The present invention uses less material as compared with conventional worm driven hose clamps because part 23 does not bend over the outside of the upward-projecting wall 21 and, thereafter, extend downward towards base 12. In addition, the housing is narrower than conventional clamps by about the thickness of the housing sheet metal. Despite this decrease in material and thickness, the housing according to the present invention has greater strength than conventional housings because the upper wall segment 19 has a higher flexural strength than conventional clamps. In conventional clamps, the portion of lower wall segment 20 that is bent around the outside of the upward-projecting wall 21 contributes practically nothing to the stiffening of the housing.

In one embodiment, the housing 1 is made from an unhardened metal. A reverse-lock tab 26 depends downwardly from a portion of a lower edge of the housing upper part 4 that projects forward from base 12. Tab 26 is disposed on a wall of the housing upper part 4 that is disposed opposite to the side extension part 18. Tab 26 can be bent upward after the insertion of the screw shank into the housing upper part 4, so that it engages in a circumferential groove 27 in the straining screw 2 that is disposed between head 6 and thread 5 (see FIG. 2). Tab 26 prevents straining screw 12 from unscrewing from housing 1 when the worm driven hose clamp is opened.

A circumferential flange 28 of screw 2 is preferably made of one piece with straining screw head 6. Flange 28 extends over the opening edge 7 of the housing upper part 4. Thus, during tensioning (i.e., tightening of the clamp) straining screw head 6 is supported on the housing upper part 4. This engagement of flange 28 with opening edge 7 additionally counteracts the moment of torsion.

Base 12 of housing 1 is vaulted (i.e., curved) in the circumferential direction of the worm driven hose clamp, largely in accordance with the clamp diameter, so that base 12 is shaped to match the curvature of the hose which is to be clamped. Thus, when the worm driven hose clamp is in the tightened state, it exerts a largely uniform pressing force against the entire circumference of the hose to achieve a tightly sealed joint between the hose and the end segment of a pipe or a connecting sleeve to which the hose is being secured.

The embodiment of the housing 1a illustrated in FIG. 5 distinguishes from the embodiment shown in FIG. 3 only by the fact that the upper wall segment 19a of the extension part 18a and, as a consequence, the transition segment 22a is vaulted upward. This curved or arched structure contributes to the stiffening of the upper wall segment 19a, and, thus, to the stiffening of housing 1a, against bending open during tensioning.

The embodiment of the housing 1b illustrated in FIG. 6 distinguishes from the embodiment shown in FIG. 3 only by the fact that the transition segment 22b is flat (i.e., bevelled) and forms an obtuse angle with respect to the upper wall segment 19 and the upward-projecting wall 21b. Thus, the bent edges between the upward-projecting wall 21b and the upper wall segment 19 of the extension part 8b contribute to the stiffening against an opening up of the upper wall segment 19. In other words, flat transition segment 22b contributes to a stiffening of the upper housing part 4 to resist any pressing upward during tensioning of the straining screw.

The embodiment of the housing 1c illustrated in FIGS. 7 and 8 distinguishes from the embodiment shown in FIG. 3 by the fact that the transition segment 22c is flat in the end regions 28 and 29, which border the opening edges of extension part 18c. End regions 28, 29 form an obtuse angle with respect to the upper wall segment 19 and the upward-projecting wall 21c. Transition segment 22c is bent into an approximately triangular shaped cross-section in a middle region 30 between end regions 28, 29. Lower wall segment 20c has a protrusion 31 that engages in middle region 30 (see FIG. 8). This configuration also increases the stiffness of the upper wall segment 19.

The embodiment of the housing 1 illustrated in FIG. 9 distinguishes from the embodiment shown in FIG. 3 only by the fact that the upper wall segment 19 and the lower wall segment 20 are joined together by means of spot welds. The spot welds are preferably projection welds 31. Alternatively, it is also possible to glue the two wall segments 19 and 20 together. Projection welds 31 do have the advantage, though, that they can be made easily and quickly without requiring any additional material.

Figure 10:
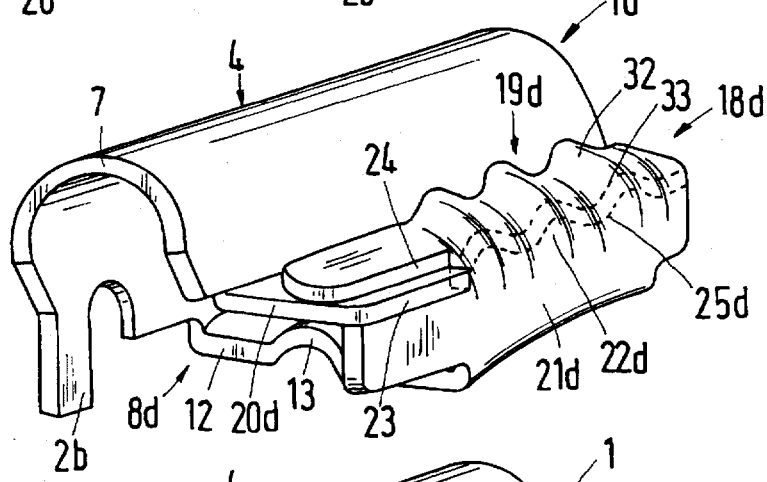

The embodiment of the housing 1d illustrated in FIG. 10 distinguishes from the embodiment shown in FIG. 3 only by the fact that transition segment 22d has a plurality of beads or undulations 32 that extend in the direction of the bend. Beads 32 extend from upward-projecting wall 21d to upper wall segment 19d. Part 25d of lower wall segment 20d also has a plurality of beads 33 that correspond with beads 32. Beads 32, 33 increase the flexural strength of the upper wall segment 19d.

Figure 11:
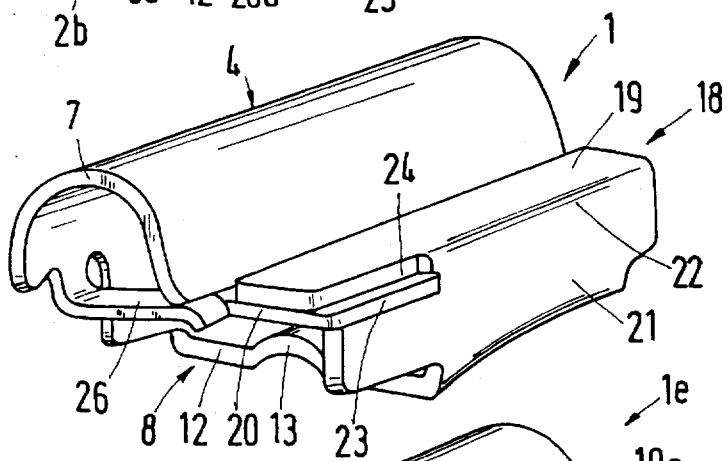

The embodiment of the housing 1 illustrated in FIG. 11 distinguishes from the embodiment shown in FIG. 3 only by the fact that it has been hardened after it was formed and, thus, has a greater flexural strength. The reverse-lock tab 26 is bent upward into the position shown in FIG. 11 before hardening because the housing material is relatively elastic after it is hardened. Therefore, after hardening, tab 26 cannot be permanently deformed from the position shown in FIGS. 3–10 into the position shown in FIGS. 2 and 11. If an attempt were made to bend tab 26 into the position shown in FIG. 11, tab 26 would spring back into its original hardened position. To insert straining screw 2 into upper housing part 4, tab 26 is bent downward from the position illustrated in FIG. 11. Thereafter, screw 2 is inserted into housing part 4. After tab 26 is inserted in part 4, tab 26 is released and, due to the tab's elastic restoring spring force, tab 26 springs back into the position illustrated in FIG. 11. Tab 26, thus, engages in groove 27 of the straining screw 2, as is shown in FIG. 2.

Figure 12:
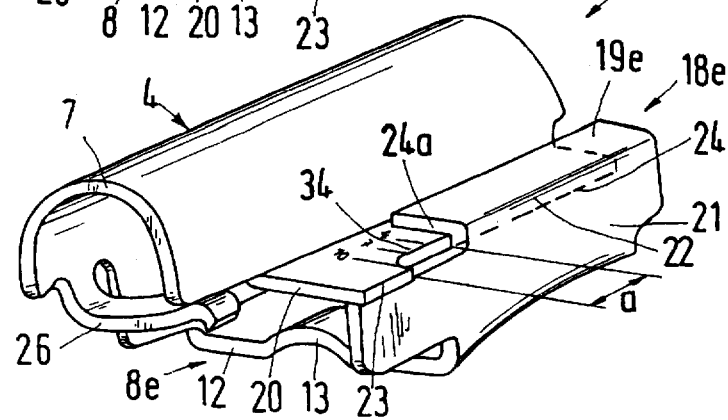

The embodiment of the housing 1e illustrated in FIG. 12 likewise distinguishes from the embodiment shown in FIG. 3 by the fact that housing 1e is hardened after it was formed into the illustrated shape. In addition, part 23 of the lower wall segment 20, which extends into the cutout 24a of the transition segment 22, is disposed at a distance from an edge of upper wall segment 19e that is disposed on the side corresponding to the straining screw head 6. This edge delimits cutout 24a. Distance a should at least be approximately equal to II·Δd, where Δd corresponds to the change of the outside diameter, in dependency on the temperature within the permissible operating temperature range of the hose to be clamped by the worm driven hose clamp. The hose is typically made from an elastomeric material. During tightening of the straining screw 2, wall segments 19e and 20 can be displaced by distance a. After tightening, wall segments 19e and 20 can spring back, due to the elasticity of the hardened housing 1e, up to the amount that the hose would contract while cooling (i.e., distance a). Thus, when the hose material shrinks due to cooling, a clamping force is still exerted by the clamp, which clamping force will continue to press the clamp tightly against the pipe or the connecting sleeve. In the reverse situation, when there is an expansion of the hose material due to a temperature increase, the distance a increases elastically to ensure that not too great of a stress is exerted on the hose material. The amount that wall segments 19e and 20 must shift for a given hose diameter to achieve the desired compensation for the contraction and expansion of the hose material can be read from a scale 34 inscribed on the top of the lower wall segment 20. The front edge of the upper wall segment 19e can serve as the indicator for reading scale 34.

Having described the presently preferred exemplary embodiment of one-piece housing of a worm driven hose clamp in accordance with the present invention, it is believed that other modifications, variations and changes will be suggested to those skilled in the art in view of the teachings set forth herein. For example, the rearward end of the transition segment 22 (see FIG. 3) can also be provided with a slot, similar to cutout 24, through which the rear part 25 of the lower wall segment 20 can project outwardly, in a similar manner as part 23. Additionally, several of the modifications shown in the various embodiments can be used jointly on one housing. For example, the modifications of FIG. 6 and 9; FIGS. 7 and 9; and FIGS. 9 and 10 can be used together in one housing. It is, therefore, to be understood that all such modifications, variations, and changes are believed to fall within the scope of the present invention as defined by the appended claims.

What is claimed is:

1. A one piece housing for a worm driven hose clamp comprising:

a screw having a head and a shank, said shank being threaded;

a vaulted housing upper part and a housing lower part, said vaulted housing upper part having an opening edge, said vaulted housing upper part receiving said shank of said screw and supporting said head at said opening edge, said housing lower part receiving a first end segment and a second end segment of a clamping band, said first end segment having screw-thread segments, said threaded shank meshing with said screw thread segments, said housing lower part including a base, said second end segment being fixed to said base, said housing lower part having only one side extension part for supporting said housing against turning during tightening of said screw, said side extension part having an upper wall comprising an upper wall segment, a lower wall segment and an upward-projecting wall, said upper wall segment and said lower wall segment overlapping each other, said upward-projecting wall being connected to said base and, by a transition segment, to said upper wall segment, a portion of said transition segment being formed to create a cutout, said lower wall segment extending, at least in part, to an inner side of said upward-projecting wall, said lower wall segment extending, at least in part, into said cutout of said transition segment.

2. The housing according to claim 1, wherein said cutout is a slot that projects, in the longitudinal direction of said transition segment, from an opening edge of said side extension part.

3. The housing according to claim 1, wherein said upper and lower wall segments extend tangentially with respect to a circumference of the clamp over an entire length of said extension part.

4. The housing according to claim 1, wherein said upper wall segment is vaulted.

5. The housing according to claim 1, wherein said transition segment is flat and forms an obtuse angle with respect to said upper wall segment and said upward-projecting wall.

6. The housing according to claim 1, wherein said transition segment is flat in its end regions adjacent to a first opening edge and a second opening edge of said side extension part, said transition segment has an approximately triangular shaped cross-section in a middle region between said end regions, said end regions form an obtuse angle with respect to said upper wall segment and said upward-projecting wall, said lower wall segment having a projection that engages in said middle region of said transition segment.

7. The housing according to claim 1, wherein said upper and said lower wall segments are joined together as a single piece of material.

8. The housing according to claim 7, wherein said upper and lower wall segments are joined by a spot weld.

9. The housing according to claim 8, wherein said spot weld is a projection weld.

10. The housing according to claim 1, wherein said transition segment has a plurality of beads extending in the direction of the bend.

11. The housing according to claim 1, wherein said housing is made of hardened steel, said housing further includes a reverse-lock tab depending from said housing upper part, said tab engaging a circumferential groove in said screw, which is disposed between said head and said threaded shank.

12. The housing according to claim 1, wherein said part of said lower wall segment that extends into said cutout is disposed at a predetermined distance from an edge of said upper wall segment that is disposed proximate to said screw head.

13. The housing according to claim 12, wherein said predetermined distance approximately corresponds to II·Δd, where Δd corresponds to the change of the outside diameter, in dependency on the temperature within the permissible operating temperature range of an elastomeric hose that is clamped by said worm driven hose clamp.

* * * * *